United States Patent [19]

DeMonte

[11] Patent Number: 4,897,651
[45] Date of Patent: Jan. 30, 1990

[54] KEY WITH SELECTIVE SYMBOL DISPLAY AND KEYBOARD USING SUCH KEY

[75] Inventor: Filippo DeMonte, Borgofranco, Italy

[73] Assignee: Ing. C. Olivetti & C., S.p.A., Ivrea, Italy

[21] Appl. No.: 919,137

[22] Filed: Oct. 15, 1986

[30] Foreign Application Priority Data

Oct. 15, 1985 [IT] Italy .................. 67873 A/85

[51] Int. Cl.⁴ ........................................... H03K 17/00
[52] U.S. Cl. ......................................... 341/23; 341/22
[58] Field of Search ............... 340/365 VL, 712, 711, 340/802, 803, 804, 784, 825.52, 825.35; 341/23, 22

[56] References Cited

U.S. PATENT DOCUMENTS

| | | | |
|---|---|---|---|
| 4,032,931 | 6/1977 | Haker | 340/365 VL |
| 4,393,379 | 7/1983 | Berting et al. | 340/784 |
| 4,500,880 | 2/1985 | Gomersall et al. | 340/825.35 |
| 4,551,717 | 11/1985 | Dreher | 340/365 VL |

FOREIGN PATENT DOCUMENTS 0041507 3/1980 Japan ............................ 340/365 VL

OTHER PUBLICATIONS

Jones, "Programmable Keytop Employing Electrochromic Display", IBM Technical Disclosure Bulletin, vol. 21, No. 4, Sep. 1978, pp. 1671-1672.

Ghosh et al., "Electronically Changeable Keyboard Key Inscriptions", IBM Technical Disclosure Bulletin, vol. 23, No. 3, Aug. 1980, pp. 1190-1193.

Primary Examiner—Alvin Oberley
Attorney, Agent, or Firm—Banner, Birch, McKie & Beckett

[57] ABSTRACT

The key comprises a movable part guided in a fixed support on a base plate and contacts which are closed when the key is depressed against the action of a return spring. The symbol associated with the key is displayed through a window in the key top by an LCD device with a matrix of display areas controlled by an integrated circuit bonded to the underside of the LCD device and fed with signals from the CPU via conductors which enable the integrated circuit to be programmed to define the symbol to be displayed, whereby the keys of a keyboard can be set to match the language currently being used. In an alternative embodiment the key is supported by a flat cable connected with an input circuit of the keyboard and the terminals of the LCD device.

7 Claims, 8 Drawing Sheets

KEY WITH SELECTIVE SYMBOL DISPLAY AND KEYBOARD USING SUCH KEY

BACKGROUND OF THE INVENTION

The present invention concerns a key for the input of data with a selective symbol display and a keyboard using this key.

A key of the diaphragm type is known, which, in the lower part thereof, comprises a liquid crystal display and, above the display, a flexible transparent film separated from the display by a suitable spacer. Two wires which are respectively deposited on the upper part of the display and on the lower part of the transparent film can come into contact to generate an input signal as a result of the transparent film being operated by means of a finger. Selective activation of the various areas permits the key to display a plurality of symbols. On the other hand, a key of that type has rather limited reliability and ergonomic characteristics and is not suitable in particular for keyboard operation for typewriters in which an error in finger operation causes incorrect characters to be printed. Furthermore, the use of a key of that type in a keyboard requires a large number of conductors for activation of the various areas, giving rise to major problems in regard to space and reliability.

SUMMARY OF THE INVENTION

An object of the present invention is to provide a key having an activatable display for the representation of a plurality of symbols, which has reliability and ergonomic characteristics which are comparable to those of keys used in the better electronic typewriters which are available on the market at the present time.

Another object of the invention is to provide a keyboard using a plurality of keys having selectively activatable symbol display which has a reduced number of connections for activation of the various areas of the display.

BRIEF DESCRIPTION OF THE DRAWINGS

The invention will be described in more detail, by way of example, with reference to the accompanying drawings, in which.

DESCRIPTION OF THE PREFERRED EMBODIMENTS

Figure 1:
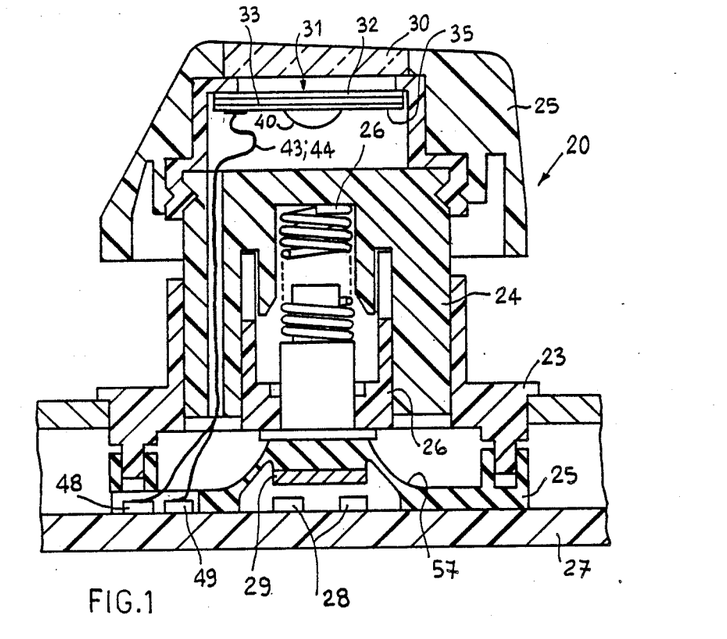
FIg. 1 is a diagrammatical sectional view of a key according to the invention.
Figure 11:
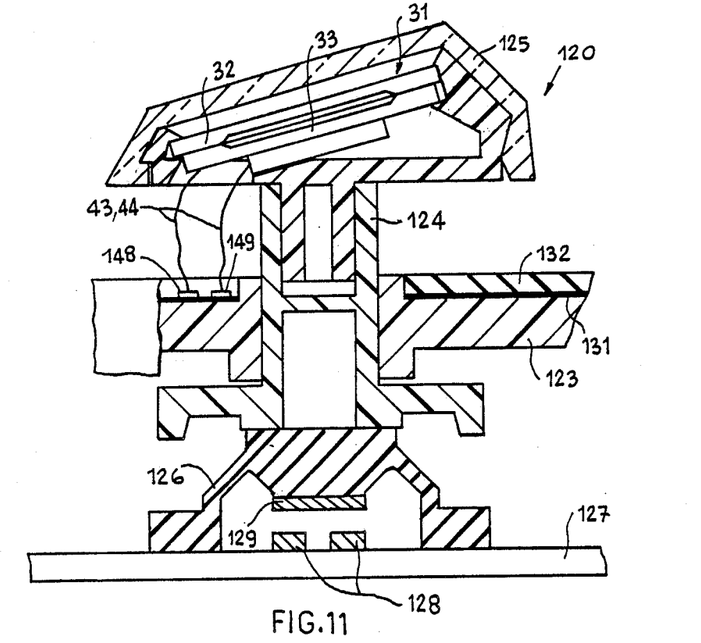
FIG. 11 is another alternative form of the key shown in FIG. 1.

Referred to FIGS. 1 and 11, a key 20 comprises a support 23, 123 which slidably guides a movable part 24, 124 provided in its upper portion with a finger-operable cap 25, 125 and normally held in a raised position by resilient means 26, 126.

The support 23, 123 is mounted in a fixed position with respect to a base plate 27, 127 which is provided with conductors 28, 128 which are electrically connected together by a movable contact 29, 129 which is movable by the movable part 24, 124. A key 20 in which the movable contact 29 is carried by a rubber 'dome portion' 57 and the means 26 are formed by a coil spring is described in the U.S. Pat. No. 4,602,138, assigned to Ing. C. Olivetti & C., S.p.A. to which reference is made for further details. In the case of the key 120 shown in FIG. 11, the resilient means 126 are formed exclusively by a 'dome portion' similar to the dome portion 57 in FIG. 1.

Figure 2:
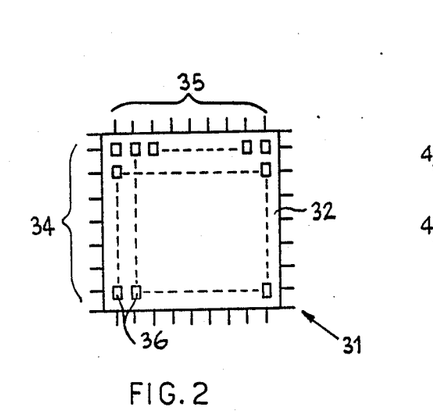
FIG. 2 is a view of a detail from FIG. 1.

In accordance with the invention, the cap 125, 25 is transparent or comprises a transparent portion 30 respectively. Fixed below the finger-operable portion of the cap 25, 125 is a liquid crystal display 31 (LCD), comprising and upper glass 32 and a lower glass 33. A double series of conductors which are distributed in the two glasses in twenty four rows 34 and thirty two columns 35 defines a matrix of areas as indicated at 36 (see FIG. 2) in a nematic liquid interposed between the two glass plates 32 and 33. Reflectance and transparency of the areas 36 can be modified electrically by the signals of the conductors 34 and 35 in per se known manner and in their whole define the symbol associated with the key, which can be easily observed through the transparent portion 30 or 125. The number of areas is sufficient for even the most complicated symbols of oriental languages to be recognised.

Figure 3:
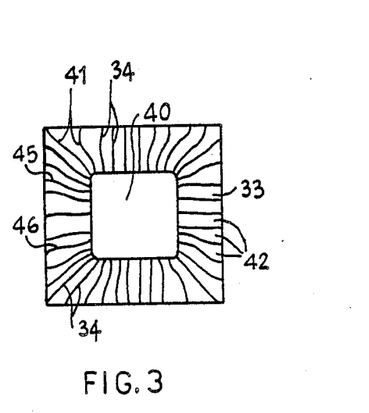
FIG. 3 is a second view of the detail shown in FIG. 2.

The conductors 34 and 35 of the display 31 are electrically connected to the output conductors of a microcircuit (chip) 40 (see FIG. 3). The chip 40 is fixed to the lower glass plate 33 of the display 31, for example by means of epoxy resin, and the output conductors thereof are electrically connected to the conductors 34 and 35 by means of the conductors 41 and 42 which are integrated on the glass plate 33 by screen printing.

The input conductors of the chip 40 are electrically connected to at least two other conductors 42 and 46 which are integrated on the glass plate 34 and which in turn are connected for example by flat cables 43 and 44 to a selector circuit 50. In the key 20 (see FIG. 1), the cables 43 and 44 are connected to conductors 48 and 49 of the base plate 27. In the key 120 (see FIG. 11), the cables 43 and 44 are connected to conductors 148 and 149 of a printed circuit 131 which is mounted above the base plate 127, provided with a shock-absorbing rubber layer 132 and supported by the support 123. In response to the signals transmitted from the circuit 50 on the conductors 45 and 46, the chip 40 selectively activates the various areas of the display 31, forming the character to be displayed.

Figure 10:
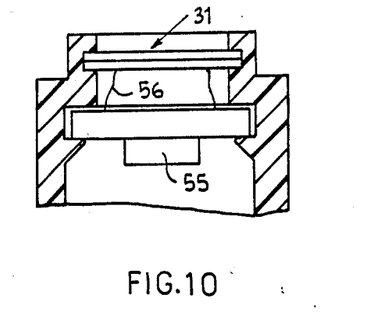
FIG. 10 is an alternative form of the key shown in FIG. 1.

In the alternative form shown in FIG. 10, the display 31 is connected to a chip 55 provided with its own container and with connecting stems of commerical type. In that case, the conductors of the display 31 are connected to the output conductors of the chip 55 for example by means of the further cables 56. As another alternative, the conductors of the chip 40 may be connected to the conductors 47 and 48 by means of conductors deposited on the upper portion of the rubber 'dome portion' 57 of the key 20.

The key 20, 120 is particularly advantageous for use in a keyboard 60 (see FIG. 4) of electronic typewriters which are intended for printing a plurality of languages A, B, . . . X and as described for example in the U.S. Pat. No. 4,580,916 assigned to Ing. C. Olivetti & C., S.p.A.

Figure 4:
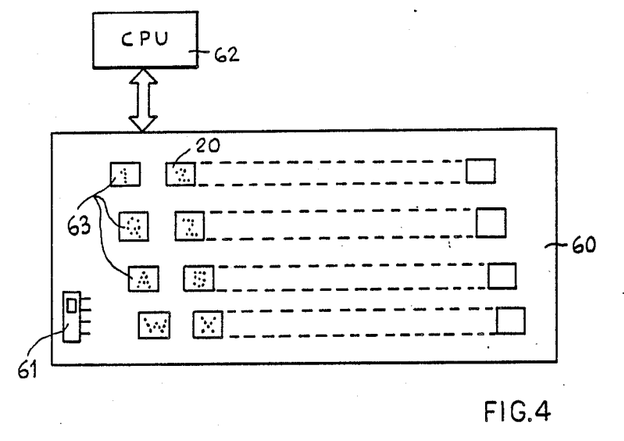
FIG. 4 is a diagrammatic view of a keyboard according to the invention.

In that Patent and in the present disclosure, the typewriter provides a selector 61 which supplies the control unit (CPU) 62 of the machine with a code indicative of the keyboard associated with the selected language A, B, . . . X. In accordance with the specific standard, corresponding groups (font) of characters and national symbols 63 which can be selectively operated by the various keys of the keyboard belong to the selected keyboard. The selector code 61 causes activation of a transcoding routine which converts the position code in respect of the depressed key 20 into a machine code in respect of the symbol introduced. The circuit 50 in turn activates the chips 40 to display at the displays 31 the symbols associated with each key 20 in the position which belongs to that symbol of the selected keyboard A, B, . . . X.

Figure 6:
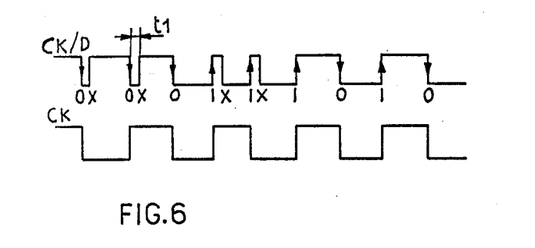
FIG. 6 shows some electrical signals of the circuit shown in FIG. 5.

The number of connecting conductors between the chip 40 and the circuit 50 may be reduced to a single pair for each chip, by providing for serial transmission of autosynchronous data as indicated by CK/D in FIG. 6. The time signal is received at each switching of the signal CK/D and the zero and one bits are transmitted respectively as low/high and high/low switching of the signal CK/D. In the case of sequential transmission of one bit, the same as the foregoing, the circuit 50 provides for a reset switching after a time t1 from switching of the first bit which is less than the response time of the circuit. Reset switching is therefore ignored both for generation of the signal CK and for recognition of the value of the bit.

Figure 7:
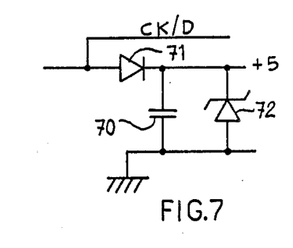
FIG. 7 is a detail from FIG. 5.

The supply voltage for each chip 40, mainly of CMOS type, is produced from the signal CK/D by means of a simple circuit comprising a capacitor 70 (see FIG. 7), a diode 71 and a Zener diode 72. The reset signal is also generated by the chips 40 at the first high switching of the signal CK/D after a sufficiently long period during which there is no signal.

The circuits of the chip 40 may be simplified in the case where the displays are of SMETIC type or the like, in which therefore the optical states of the areas 36 are defined by suitable switching signals on the intersecting conductors 34 and 35 and provide the characteristics thereof with a 'memory' effect until fresh switching signals are generated. In that case the chips 40 become simple decoders for the signals CK/D.

Figure 5:
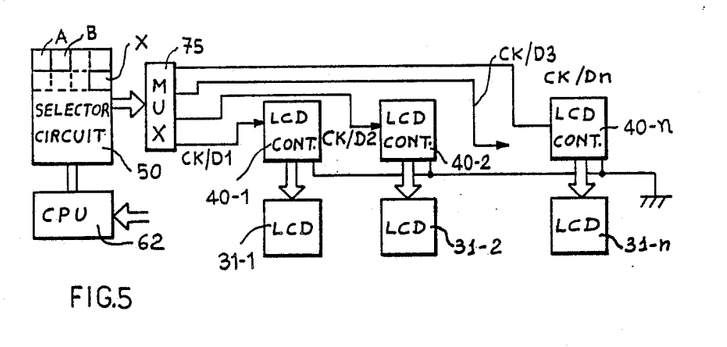
FIG. 5 is a block circuit diagram of the keyboard shown in FIG. 4.

The circuit 50 supplies the chips 40-1, 40-2, 40-n by means of one or more multiplexers 75 provided with outputs CK/D1, CK/D2 . . . CK/D. The circuit 50 is provided with memory locations A, B, . . . X where there are stored the bits which define the optical state desired for the individual areas 36 of each keyboard A, B, . . . X.

An initialisation phase of the keyboard involves the generation in succession of the signals CK/D1 which define the state of all the areas 36 of the first chip 40-1 and progressively the other signals CK/D2 . . . CK/Dn, until all the symbols corresponding to the national keyboard A, B, . . . X selected, are represented. Since there is no activation of the chips until the state of the selector 61 is changed, the functions of the circuit 50 can be performed directly by the CPU of the machine and the respective memories, without adversely affecting the levels of performance.

If the number of keyboards which can be selected is very high, the number of memory locations of the circuit 50 may be substantially reduced by using packing techniques or redundancy elimination techniques, in ways which are known in the art.

In the case of LCD without a memory effect, the chips 40 also provide for 'refreshing' of the signals for the areas 36 and each chip 40 comprises an RAM for storing the corresponding signals for the key which are derived from the selected location in the circuit 50 and the logic circuits which provide for the cyclic supply of the areas 36.

Figure 8:
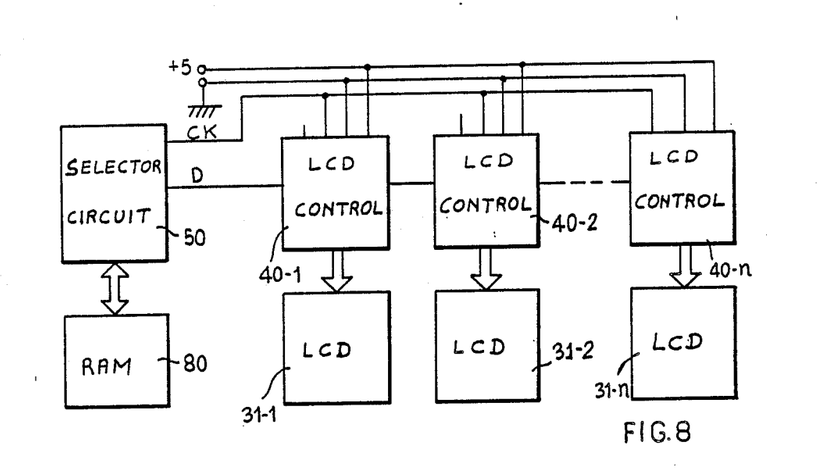
FIG. 8 is an alternative form of the block shown in FIG. 5.

In the diagram in FIG. 8, the chips 40 are very simple and the refreshing function is performed by a high-speed circuit 50 which is connected to an external RAM 80 and in which the chips 40 are connected in series by three conductors, data conductor D, clock signal conductor CK and feed conductor +5.

Each chip 40 comprises a data input terminal and a data output terminal. The first chip 40-1 has its data input terminal directly connected with the circuit 50. Each other chip has its data output terminal connected with the input data terminal of a following chip and its input data terminal connected with the output data terminal of a preceding chip. The selection information for all the areas 36 of the chips are transmitted in sequence and each chip provides to select in the correct time information pertaining to its connected display. A reset code for all the chips is preliminary sent by the circuit 50 (FIG. 5) of the present disclosure and each chip 40 comprises a suitable decoder circuit to recognize the reset code.

Figure 9:
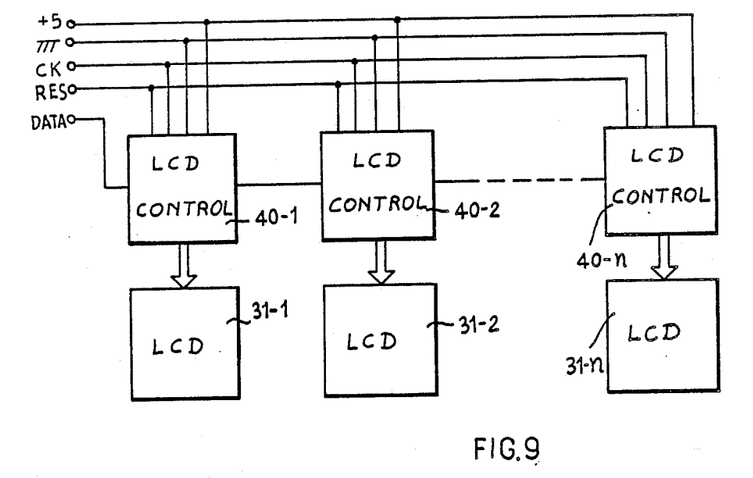
FIG. 9 is a second alternative form of the block shown in FIG. 5.

In the diagram of FIG. 9, the chips are connected serially as in FIG. 8, are devoid of the decoder circuit to recognize the reset code and their resetting function is performed by the circuit 50 through another dedicated conductor RES common to all the chips 40.

Figure 12:
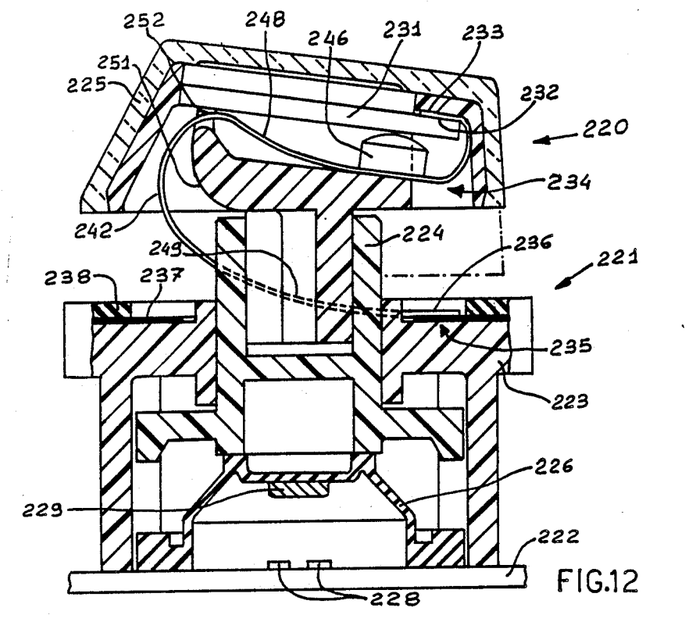
FIG. 12 is a further alternative form of the key according to the invention.
Figure 13:
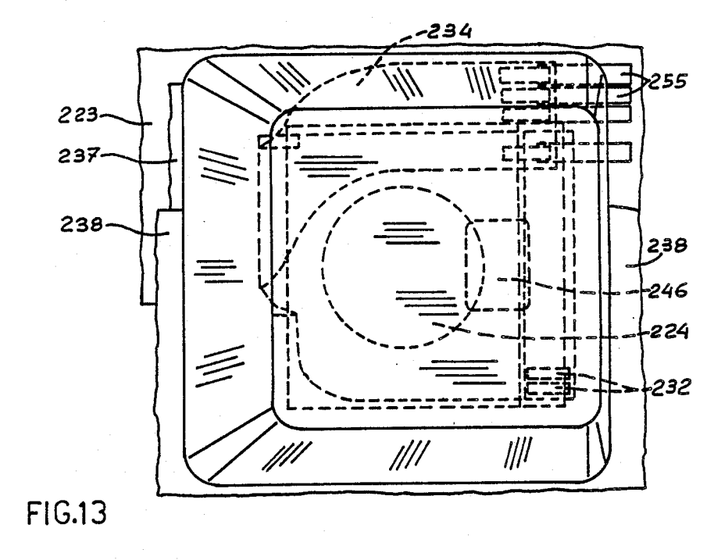
FIG. 13 is a top view of the key of FIG. 12.

The FIGS. 12 and 13 relate to a key 220 similar to the key 120 of FIG. 11 and comprising a movable part 224 provided in its upper part with a finger-operable cap 225. The key 220 is included in a keyboard 221 comprising a lower support frame 222 and an upper support 223. The upper support 223 slidably guides the movable part 224 and the part 224 is normally held in a raised position with respect to the support 222 by a rubber "dome portion" 226. The key 220 cooperates with output conductors 228 (FIG. 12) supported by the lower support 222. A depression of the key 220 provides an electrical connection of the conductors 228 by means of a movable contact 229 of the rubber dome portion 226 in a manner known per sé. Other kinds of switching or sensing elements of capacitive, inductive or others can be provided as alternative.

The cap 225 is transparent and covers an LCD display 231 similar to the LCD display 31 of FIG. 11 and having a matrix of sixteen rows and twenty-four columns of dots connected to corresponding side terminals 232. These terminals 232 are electrically connected with first ends 233 of a flat cable 234 having second ends 236 electrically connected with terminals 235 by an input board 237 bearing on the upper support 223 and covered by a shock-absorbing rubber layer 238.

According to the invention, a chip 246 is supported by the flat cable 234 on an upper portion 248 adjacent to the first ends 233, and has its terminals electrically connected with the conductors of the flat cable for being connected with the terminals 233 of the display 231 and the terminals 235 of the input board 237. The flat cable 234 is folded by itself through a bent portion 242 of relatively large radius and comprises a lower portion 249 adjacent to the second ends 236. The upper portion 248 supports the driver chip 246, bears on an upper portion of a key stem 251 of the cap 225 and crosses a slot 252 of the key stem 251. The lower portion 249 of the flat cable has its ends 236 below and offset with respect to the ends 233.

Figure 14:
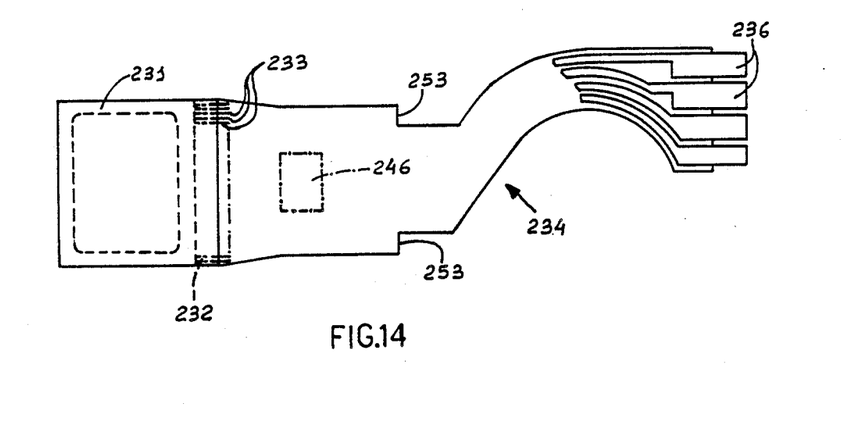
FIG. 14 is a view of the key of FIGS. 12 and 13.

The flat cable 234 (FIG. 14) has an insulative layer of mylar or kapton, or other foexible high quality material, provides conductive areas, on a single face and, on this case, the chip 246 is of "slip" type having its terminal embedded in a soldering layer to be soldered by the combined action of low heat, pressure and vibration with the conductive areas of the cable 234. The input board 237 comprises, for all the keys, also a common flat cable having an insulative layer of mylar of kapton whose terminals 235 for each key 220 are constituted by conductive areas to be soldered with the second ends 236 of an associated flat cable 234. The ends 233 and 236 of each cable 234 comprise portions of the conductive wires projecting from the insulative layer of the cable and which are soldered with conductive areas defining the terminals 232 and 235 of the display 231 and the common flat cable 237, respectively.

The assembly of the keyboard 221 provides the preliminary soldering of a chip 246 and a display 231 with a flat cable 234 for each key 220. The display 231 (FIG. 12) is inserted in a seat of the key stem 251 and the cable 234 is inserted in the slot 252. Thereafter, the ends 236 are soldered with the conductive areas 235 and the key stem 251 is inserted in the movable part 224.

The replacement of a defective display-cable-chip sub-assembly for each key 220 occurs by removal of the cap 225, cutting conductors and insulating layer of its cable 234 adjacent to the second ends 236 and removal of the defective sub-assembly. The mounting of a new sub-assembly includes soldering of the wires of the ends 236 of the new cable 234 overposed and shifted with respect to the cutted ends 236 of the removed cable. The new soldering causes the radius of the bent portion 242 to become larger without affecting the reliability of the key.

In the case of a flat cable 234 having conductive areas on both faces, the terminals of the chip 246 are constitued by tips or wires crossing the insulated layer of the cable and soldered with the conductive areas of the opposite face of the cable 234. The replacement of a defective sub-assembly occurs as in the preceding case, but no shifting of the ends 236 is necessary and there is no modification in the bent portion 242.

A depression of the key 220 reduces a little the radius of the bent portion 242, largely within the fatigue limits of the cable 234, without causing any flexion in the upper portion 248. The cable 234 provides two shoulders 253, adjacent to its upper portion 248, which cooperate with the sides of the slot 252 to prevent any shifting of the cable. Therefore the portion of the cable 234 including the solderings with the chip 246 is not affected by flexure solicitations during depression of the movable part 224.

The keys 20, 120, 220 are also particularly advantageous for use in a keyboard 260 (FIG. 15) which is a further modification of the keyboard 60, and provides a controller circuit 261 connected through a reduced number of conductors with n+m driver chips 246. These chips 246 comprise two groups of chips designated with the suffixes A and B, namely, 246-A1, 246-A2...246-An; and 246-B1, 246-B2...246-Bm, wherein the n chips of the group A and the m chips of the group B are connected in a serial fashion. The output circuits of the keyboard 260 connected with the conductors 228 are known per sé and are not shown in the figure.

Figure 15:
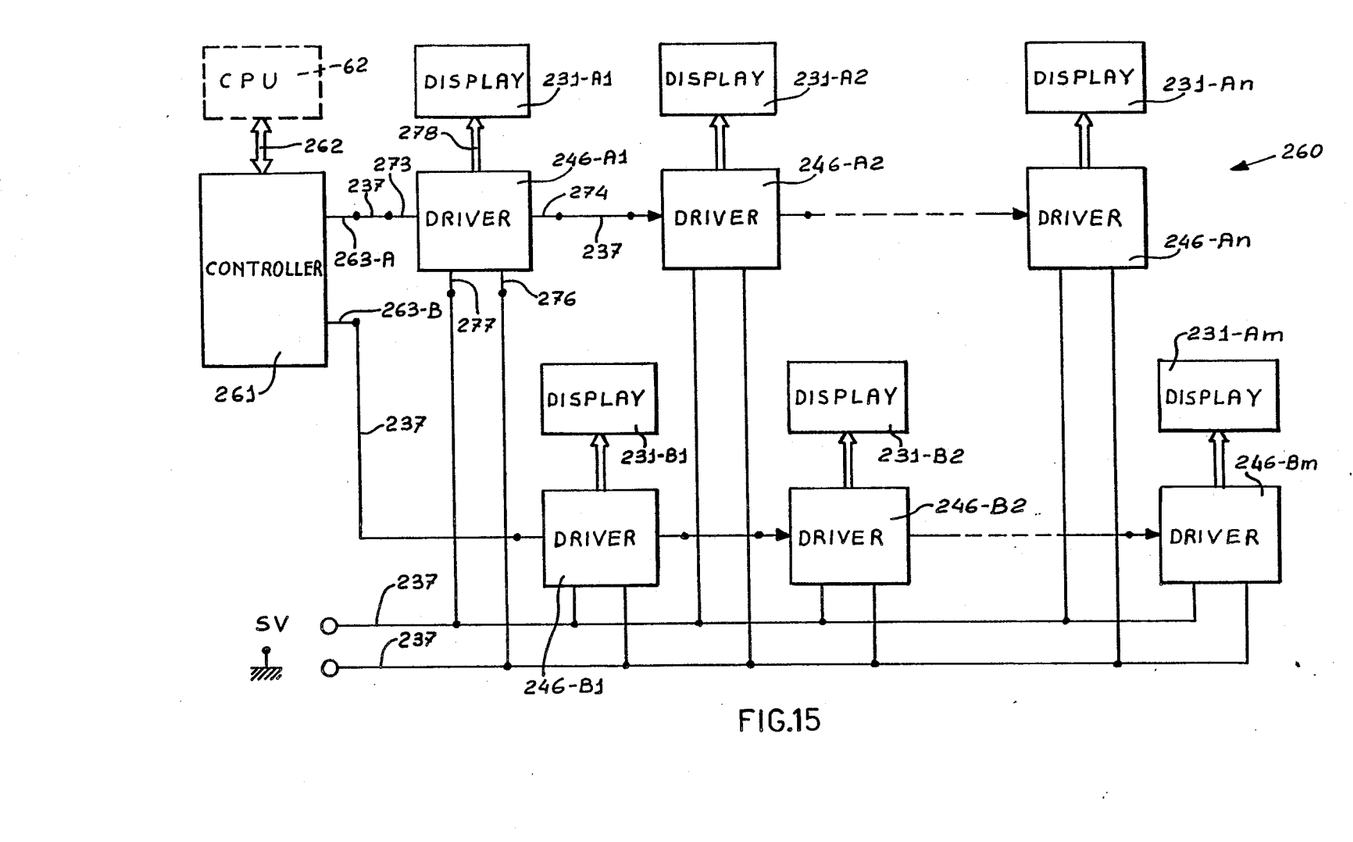
FIG. 15 is a third alternative form of the block shown in FIG. 5.

The controller circuit 261 is connected, via a data bus 262 with the CPU 62 of the machine and feeds the driver chips 246-A and 246-B with strings of trains of pulses including a reset code and data codes, as control information for the new characters to be displayed in the keys. The controller circuit 261 also feeds the driver chips with refresh codes when the displayed characters should remain unchanged. It is achieved through two sole output terminals 263-A and 263-B of the controller circuit 261 which are connected, via the input board 237, with the first driver chips 246-A1 and 246-B1 of the two groups of chips 246-A and 246-B, respectively.

Each chip 246 comprises an input terminal 273, a control output terminal 274, two feed terminals 276 and 277 and a group of display output terminals 278. The input terminal 273 of each chip 246-A, 246-B is connectable either to the output terminal 263-A, 263-B of the controller circuit 261 or with the control output terminal 274-A, 274-B of another chip 246-A, 246-B. The feed terminals 276 and 277 are connected with the terminals of a power supply, not shown in the drawings and the output display terminals 278 are connected with the terminals of the display 31, 231.

In the case of the key 220, the terminals 273, 274, 276 and 277 are connected with the four wires of the cable 234, connected with the ends 236 of the input board 237 and the display output terminals 278 are connected with the forty wires of the cable 234, connected with the ends 232 of the display 231.

Each chip 246 (FIG. 16) comprises a power-on reset circuit 281, a clock generating circuit 282, a delay circuit 283, a decoder circuit 284, a four phases generator circuit 285, a RAM memory 286, a RAM address counter 287, a RAM timing and control 288, a display driver circuit 289, an end of counting counter 290, and an output control circuit 292. The RAM memory 286 has 384 of one bit locations of memory associated with the 384 dots of matrix of the display 231 and the status of the locations of the RAM defines the optical status of the dots of the display 231.

In a preferred embodiment, the pulses coming from the controller circuit 261 of FIG. 15 are autosynchronous. The reset code and the data codes each include a train of eight pulses and are represented with the numerals 14a, 14b and 14c in FIG. 17. These pulses are similar to the ones of FIG. 6, and have a rising edge up to the high level at constant 1 MHz frequency, defining a clock commutation and a restore commutation to provide an end portion of low level and whose phase in a clock period defines a bit information. In particular restore commutation defines in the last part or in the first part of the clock period in its intermediate portion the high level (one) or to the low level (zero) bits associated with the information to be transferred to the chips 246. Each refresh code includes the train of pulses REFRESH in FIG. 17, all of zeros. The signals entering in the chips 246-A1 and 246-B1 are the pulses directly geerated by the controller circuit 261.

Figure 16:
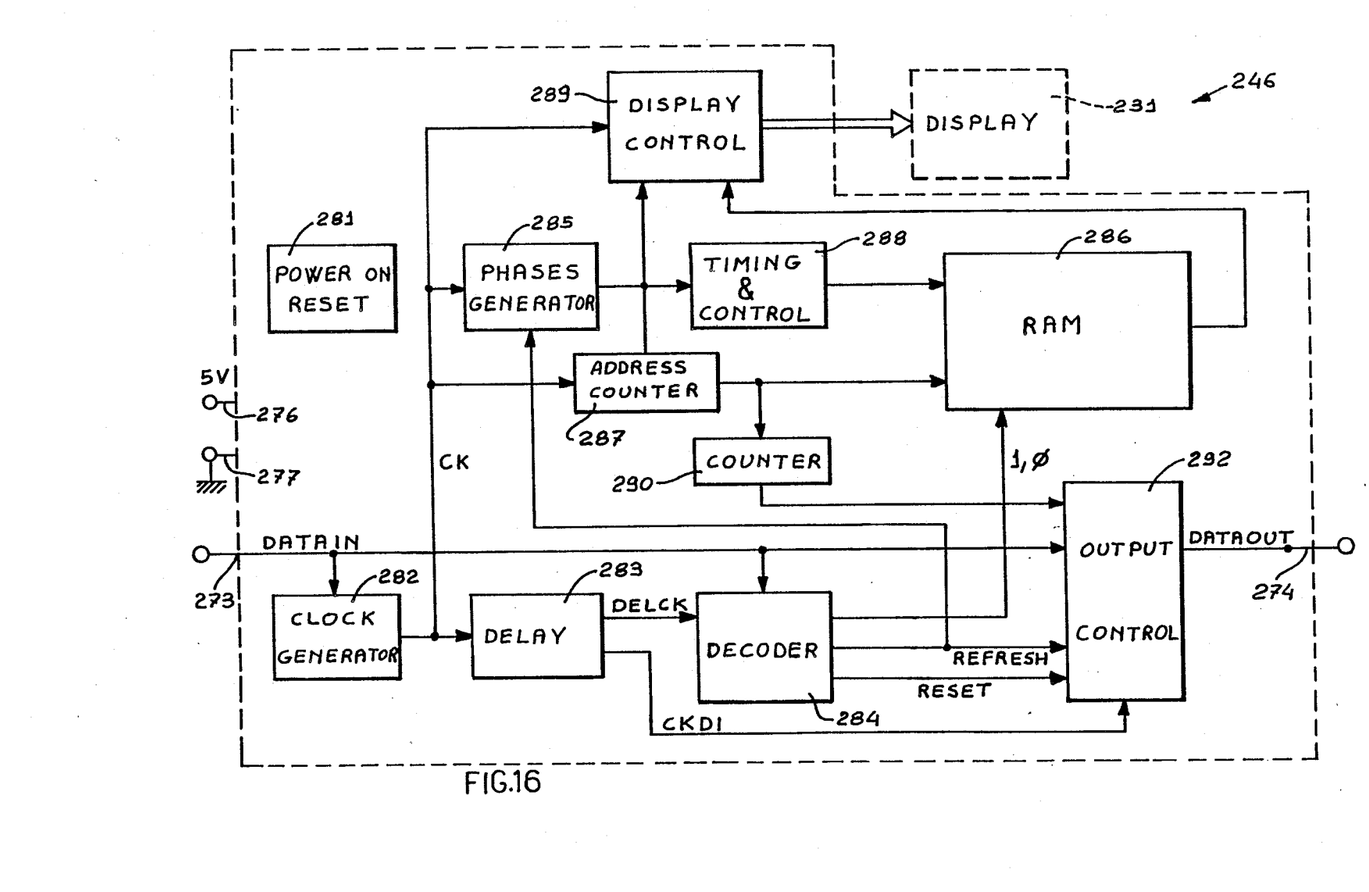
FIG. 16 is a detail from FIG. 15.

The signals on the input terminals 273 are indicated as DATAIN and the signals on the output terminals 274 are indicated as DATAOUT. The clock generating circuit 282 derives from each rising edge of the DATAIN signal, 1 MHz square wave pulses CK, from which the circuit 285 derives four phases signals for the feeding of the RAM 286 and the display control circuit 289. The delay control circuit 283 derives from the clock pulses CK delayed pulses CKD1 and DELCK for the timing of the decoder circuit 284 and the output control circuit 292. Moreover, the decoder circuit 284 derives from the signals DATAIN and pulses DELCK unmodulated signals REFRESH synchronous with DATAIN identical to the pulses from the controller circuit 261, also defining the refresh code and all constitued by short pulses (zeroes). The signals REFRESH are sent to the output control circuit 292 and utilized to refresh the status of the RAM memory 286 and the display 231.

Figure 17:
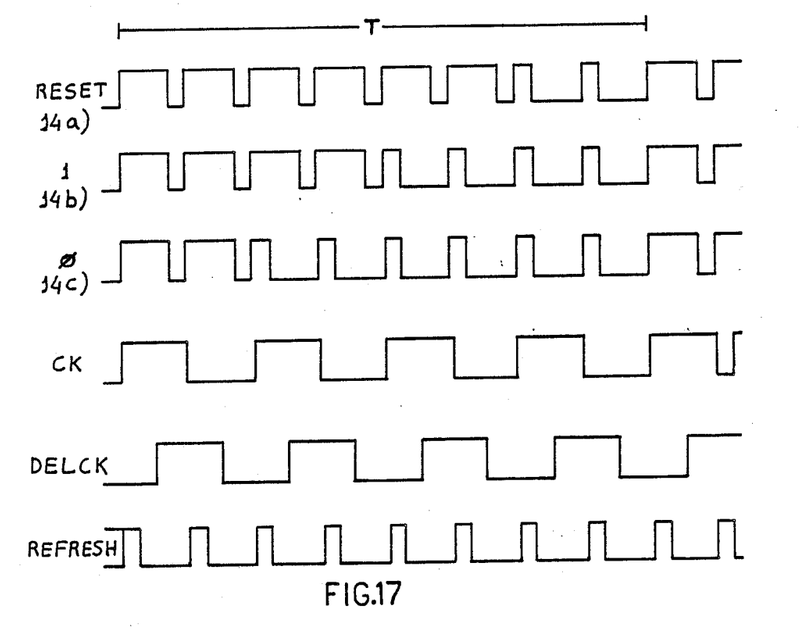
FIG. 17 shows signals from the circuit of FIG. 15.

The trains of DATAIN signals 14a, 14b and 14c of FIG. 17 inlcuded in a period T, as defined by eight commutations of DELCK pulses, comprise a "reset" information a "one" and a "zero" bit information, defining the reset code and the data codes, respectively, in dependence of the high and low levels of DATAIN found in the different phases of the period T. The decoder circuit 284 (FIG. 16) recognizes in the string of DATAIN signals a "reset" code in response to a low value of DATAIN associated with the seventh commutation of the DELCK pulses, corresponding to sequence 11111100 and a "one" and a "zero" code information in response to a low value of DATAIN associated with a fifth and a third commutation of the DELCK pulses, and corresponding to sequences 11110000 and 11000000, respectively. Upon recognizing a bit information the decoder circuit 284 actuates a writing conductor 1,0 for writing a "one" or a "zero" bit in the RAM 286, through suitable circuits including the timing and control circuit 288 and the address counter 287.

The signals DATAOUT which leave the output control circuit 292 of a given chip 246-Ai, 246-Bj have the same timing features of the signals DATAIN entering in the chip and represent the signals DATAIN for the following chip 246-Ai+1, 246-Bj+1 in the serial connection of FIG. 15. Each output control circuit 292 receives the signals DATAIN and REFRESH, is connected with the end of counting counter 290 and transmits as DATAOUT either the signal DATAIN with the asociated information received on the input terminal 273, or the unmodulated signals REFRESH devoid of information generated by the decoder circuit 284.

The mode of operation of each driver chip 246 is the following.

Upon the start up of the keyboard, the power-on reset circuit 281 (FIG. 16) clears the RAM memory 286 and the display 231 and sets the other circuits of the chip 246 in a predetermined status, providing, inter-alia, the enabling of the control output circuit 292 to the unchanged transmission of the received signals DATAIN.

The first train of signals DATAIN of the controller circuit 261 (FIG. 15) contains the "reset" code and reaches all the chips 246 in view of the temporary "transparency" of the chips 246-A, 246-B. The "reset" code is recognized by the decoder circuit 284 of the chips 246 and causes the switching of the output control circuit 292 to transmit only the unmodulated signals REFRESH coming from the decoder circuit 284. The following train of DATAIN signals contains the first "zero" or "one" bit information and reaches only the first chip 246-A1, 246-B1. This information is decoded by the decoder circuit 284 and is written in the first location of the RAM memory 286 for defining the optical status of the first dot of the display 231. The RAM address counter 287 is also updated for the addressing of the second bit information in the second location of the RAM 286. This process continues in similar manner for the setting of all the 384 locations of the RAM 286 and the associated dots of the display 231 in view of representing the first character of the keyboard.

Upon the 384th bit of information has been decoded by the circuit 284, the end of counting counter 290 sets the output control circuit 292 to transmit unchanged the DATAIN signals as DATAOUT to the following chip 246-A2, 246-B2. The decoder circuit 284 stops the actuation of the writing conductor 1,0 upon recognizing the 384th bit. The circuit 288 stops the writing of bits on the RAM 286 and the circuits 284 and 285 clock and refresh the signals for the RAM 286 and the display driver circuit 289.

The operation of the other driver chips 246-A2, 246-B2 is similar to the one of the first chip 246-A1, 246-B1, with the difference that, after the receipt of the "reset" code, the second chip 246-A2, 246-B2 receives 384 unmodulated trains of signals REFRESH which hold the RAM 286 and the display 231 in the blank status and which are transmitted unchanged to the following chip 246-A3, 246-B3.

When the output control circuit 292 of the first chip 246-A1, 246-B1 is set to its "transparent" status, the bit information entered in the driver chip 246-A2, 246-B2 is decoded by the associated decoder circuit 284 and updates the RAM 286 and the driver 231 as previously described, in connection with the operation of the first chip 246-A1, 246-B1.

The displaying of the various characters on the displays 231 occurs sequential and when the controller circuit 262 has transmitted the codes of character for all the keys, it generates only unmodulated REFRESH signals which "refresh" the memory and the display of all the keys 220.

It will be clear that the key and the keyboard as described above may be the subject of other modifications and alterations without departing from the scope of the invention. By way of example, it is possible to provide for reversed switching of the activated areas with respect to the unactivated 'background' areas, to define a different state of the machine.

What I claim is:

1. A keyboard for a data entry system comprising a plurality of keys each one having a symbol display member having a matrix of electrically activatable terminals for displaying a matrix of areas representative of an associated symbol, and a controlling circuit for generating selection information for sequentially actuating the activatable terminals of the matrixes of said plurality of keys, wherein each display member is driven by an associated driver microcircuit and each driver microcircuit comprises:

display control circuit means connected with the activatable terminals of said display member for displaying the matrix of areas of the associated symbol;

at least an input conductor, wherein the input conductor of a first microcircuit is connected with said controlling circuit;

at least a data output conductor and an output control circuit feeding said data output conductor, wherein the input conductor of each other driver microcircuit is connected with the data output conductor of a preceeding driver microcircuit and said data output conductor is connected with a following microcircuit;

means for storing a predetermined number of selection information for the selective actuation of all the areas of the associated display; and means conditioning said output control circuit for causing said output control circuit not to feed said selection information to the following driver microcircuit jointly with the storing of said predetermined number of selection information and to transmit said selection information to said following microcircuit after the storing of said predetermined number of selection information.

2. A keyboard according to claim 1, wherein said selection information comprise a given number of pulses and said each microcircuit comprises timing and decoding means responsive to said pulses for the actuation of said display member.

3. A keyboard according to claim 2, wherein said each driver microcircuit comprises a memory to store the display information for the character to be displayed, and a circuit to derive from said input conductor refresh information to be transmitted to the following microcircuit through said output control circuit during the storing of said predetermined number of selection information in said each driver microcircuit.

4. A key assembly for introducing data comprising support means supporting at least two main conductors and control conductors; a switch actuable to connect together said two main conductors of the support means to introduce an item of data; a movable part which is movable with respect to the support means to actuate said switch and introduce said item of data; a cap member fixed to said movable part, wherein said cap member can be finger-operated and has a transparent upper element; a display plate having a matrix of electrically activatable areas and display input conductors to receive display signals for activating said matrix of areas and displaying a symbol representative of the item of data which can be introduced by said key assembly, wherein said display plate is carried by said movable part and said matrix of areas can be seen through said transparent element of the cap member; a microcircuit chip, having chip conductors to receive input signals and feed output signals and a processing circuit for processing the input signals and feeding said output signals for said display plate; and a flat cable having a insulative and flexible layer and cable conductors supported by said support layer;

wherein said cable conductors comprise input areas, output areas and intermediate areas, wherein said input areas and said output areas are connected with said control conductors and said display input conductors, respectively, and wherein said intermediate areas are connected with the chip conductors to cause said microcircuit chip to receive the input signals from the control conductors and to feed the output signals to the display plate;

wherein said flat cable interconnects said support means with the display plate, has a folded configuration to define an upper portion and a lower portion and comprises an upper end of said upper portion fixed to said movable part adjacent to said cap member, a lower end of said lower portion being fixed to the support means and a bent portion intermediate between said upper portion and said lower portion deformable upon depression of said cap member;

wherein said movable part further provides an arrest member cooperative with said upper portion between said intermediate bent portion and said end portion to fixedly support said upper portion substantially parallel to said display plate and below said display plate, in order to cause bending of said bent portion and to avoid said upper portion being deformed upon depression of said cap member; and wherein said upper portion carries said intermediate areas and said microcircuit chip.

5. A key assemblyy for introducing data, comprising a display having a matrix with a plurality of electrically activatable areas for displaying a symbol representative of the data, a control microcircuit having display output conductors connected to the areas of the matrix for activation thereof, and a single input conductor to receive control display pulses for modifying and holding the symbol displayed by said matrix;

wherein said control display pulses are autosynchronous type and comprise a string of trains of pulses, wherein each one of said trains of pulses includes a pre-set number of clocking commutations and restoring commutations, wherein the clock commutations have a fixed time period and each restoring commutation is interspaced with two clock commutations according to a first phase or a second phase in each time period;

wherein the string of trains of pulses defines a reset code, display codes and refresh codes, wherein the reset code has a first sequence of said first phases and said second phases, each one of the display codes has second and third sequences of said first phases and said second phases, respectively, and each one of the refresh codes has a fourth sequence of said first phases, and wherein said reset code precedes the display codes and the refresh codes in said string of trains of pulses for modifying said symbol; and wherein said microcircuit further comprises a clock generating circuit responsive to said control display pulses for extracting clock pulses associated with clock commutations;

decoder circuit means receiving said control display pulses and said clock pulses for recognizing in the string of trains of pulses the reset code and the display codes and generating a reset signal and display signals, respectively, and including refresh generating means for generating said refresh codes from said control display pulses independently of said first, second, third and fourth sequences;

memory means to store a plurality of display bits in response to a corresponding number of said display signals which follow said reset code and associated with said plurality of activatable areas; and diaplay control means responsive to recorded display bits of the memory means, said clock pulses and said refresh codes in order to activate said plurality of electrically activatable areas for modifying said symbol and holding visible a modified symbol.

6. A key assembly according to claim 5, further comprising:

a single output data conductor and an output control circuit feeding said single output data conductor;

means conditioning said output control circuit for causing said output control circuit to feed said output data conductor with said refresh codes, as generated by said refresh generating means, jointly with the recording of said plurality fo display bits;

means limiting the storing on said memory means of a first plurality of said display bits; and means causing said first sequence of the first and second phases defining said reset code abnd said refresh codes, as received on said single input conductor, to be transmitted unchanged from said single input conductor to said single output data conductor, such that another key assembly identical to said first mentioned key assembly can be connected with said first mentioned key assembly, providing that the input conductor of said other key assembly is connected to the output data conductor of the first mentioned key assembly, so that said other key assembly is not affected by a first number of trains of control display pulses equal to said plurality of display bits and following the reset code and modifies the symbol displayed by the matrix in response to another equal number of trains of control pulses following said first number of trains of control display pulses.

7. A first key assembly for introducing data, said first key assembly being one of a series of key assemblies of a keyboard, identical to each other, to be connected with a common controller circuit, wherein said common controller circuit is provided to generate a string of trains of control display pulses, each key assembly of said series of key assemblies comprising a display member defined by a matrix of electrically activatable areas for displaying a symbol representative of the data; and a control microcircuit provided with display output conductors connected to the areas of the matrix for activation thereof and a single input conductor to receive said string of trains of control display pulses, said microcircuit further comprising:

decoding means for extracting from said string of trains of control display pulses a reset signal and display bits for modifying the symbol displayed by said matrix;

an output control circuit and an output data conductor connected with said output control circuit, wherein said output control circuit is settable to transmit unchanged said control display pulses from said single input conductor to said output data conductor;

first setting means to cause the storing of a given number of display bits from said string of trains of control display pulses which follow the reset signal for the selection of a symbol of said display member and the simultaneous controlling of said output control circuit to stop the transmission of a pre-set number of said trains of control display pulses to said output data conductor, wherein said pre-set number is equal to said given number;

switching means for conditioning said output control circuit to transmit unchanged said control display pulses to said output data conductor after the storing of said given number of display bits in order to cause an input conductor of the microcircuit of said first key assembly to be connected with the common controller circuit for the selection of a first symbol and an input conductor of the microcircuit of a second key assembly of said series of key assemblies to be connected with the output data conductor of the microcircuit of said first key assembly for the selection of a second symbol; and control means for stopping the storing of said display bits after the storing of said given number of display bits and following the reset signal, in order to cause said first key assembly to hold unchanged the stored given number of diaplay bits of the first symbol.

* * * * *